United States Patent [19]
John

[11] 3,763,960
[45] *Oct. 9, 1973

[54] LUBRICATING SYSTEM FOR INTERNAL COMBUSTION ENGINES

[75] Inventor: Veit John, Frankfurt (Main) Wiesbaden, Germany

[73] Assignee: Farbwerke Hoechst Aktiengesellschaft Vormals Meister Lucius & Bruning, Frankfurt/Main, Germany

[ * ] Notice: The portion of the term of this patent subsequent to Sept. 21, 1988, has been disclaimed.

[22] Filed: Apr. 5, 1971

[21] Appl. No.: 131,358

Related U.S. Application Data
[63] Continuation-in-part of Ser. No. 806,050, March 11, 1969, Pat. No. 3,606,935.

[30] Foreign Application Priority Data
Mar. 16, 1968  Germany.................. P 16 01 980.0

[52] U.S. Cl.............................. 184/6.13, 123/196 S
[51] Int. Cl............................................. F16n 39/06
[58] Field of Search.......................... 184/6.3, 6.13; 123/196 S

[56] References Cited
UNITED STATES PATENTS

| | | | |
|---|---|---|---|
| 3,606,935 | 9/1971 | John | 184/6.13 |
| 2,526,197 | 10/1950 | Cannon et al. | 123/196 S |
| 2,867,203 | 1/1959 | Easton et al. | 184/6.3 X |

FOREIGN PATENTS OR APPLICATIONS

| | | | |
|---|---|---|---|
| 525,769 | 6/1921 | France | 184/6.13 |
| 501,998 | 3/1939 | Great Britain | 184/6.13 |

*Primary Examiner*—Manuel A. Antonakas
*Attorney*—Curtis, Morris & Safford

[57] ABSTRACT

A lubricating system for internal combustion engines, particularly for automobile engines, has a removably mounted reservoir for lubricating fluid, a dry sump, and an electric pump which draws lubricating fluid and air from the dry sump to the reservoir immediately prior to the first turn of the engine and maintains the air and lubricating fluid in the reservoir under pressure from immediately prior to the first turn of the engine and during the operation thereof to supply lubricating fluid to the lubricating points in the engine.

5 Claims, 1 Drawing Figure

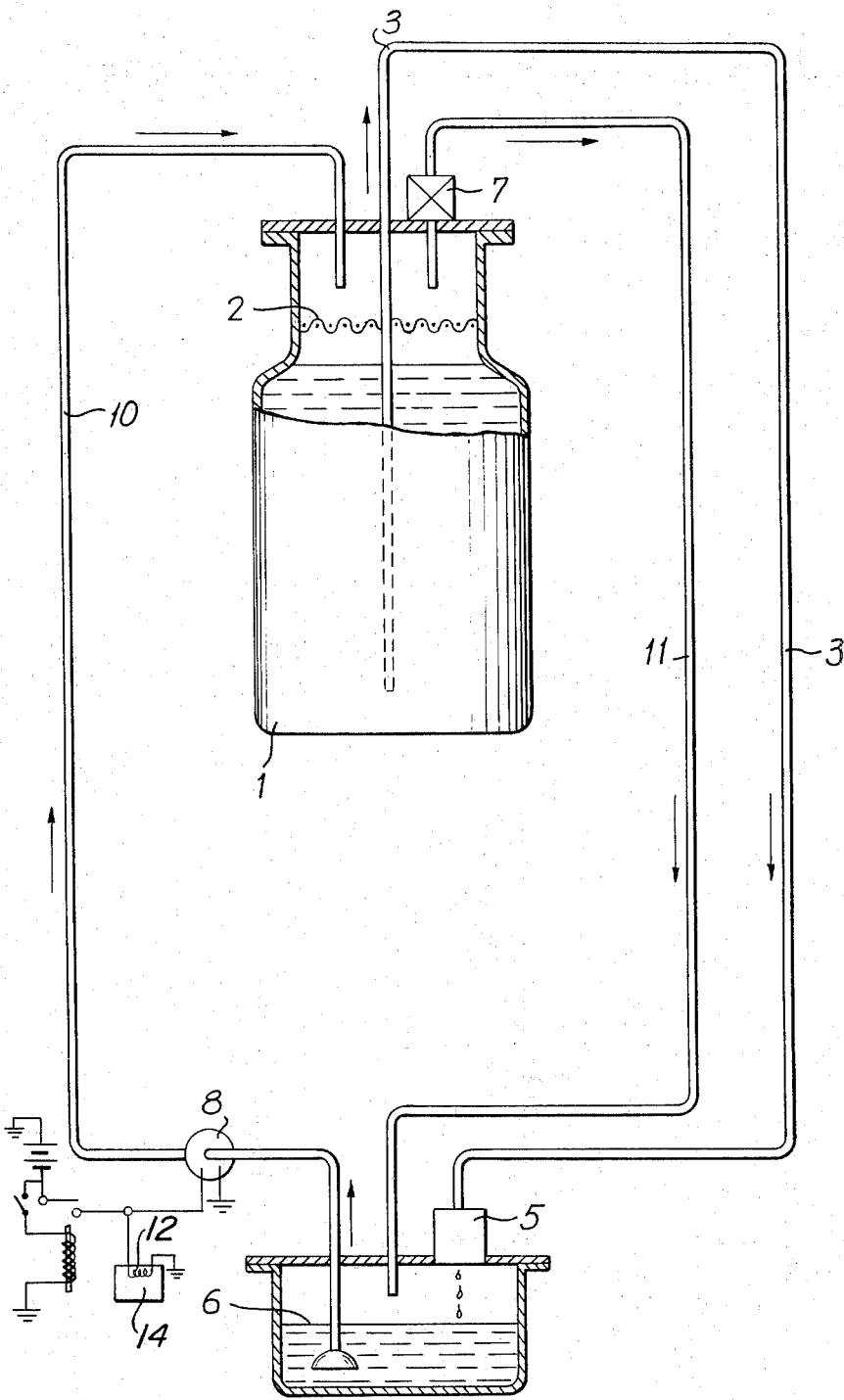

LUBRICATING SYSTEM FOR INTERNAL COMBUSTION ENGINES

This application is a continuation-in-part of copending U. S. Pat. Application Ser. No. 806,050 filed Mar. 11, 1969, now Pat. No. 3,606,935, the disclosure of which is incorporated herein by reference.

The present invention relates to a lubricating system for internal combustion engines, and more particularly to a lubricating system for automobile internal combustion engines.

Besides other lubricating systems, there have already been proposed the pure circulating forced lubrication and the dry sump lubrication systems. The former is particularly useful for lubricating the internal combustion engines of automobiles and the latter is utilized to lubricate large diesel and airplane engines.

In the case of the pure circulating forced lubrication system, the oil is contained in an oil pan mounted in or at the bottom casing of the engine, pumped from the oil pan to the lubricating points, and from these lubricating points flows back to the oil pan. The oil contents of the pan, and consequently the size of the latter, must be selected in a manner such that even under complicated driving conditions, for example, braking, cornering, or hill climbing, there is a sufficient supply of oil in the pan so that the pump does not idle. In order to effect this, more oil must be provided in the system than is actually necessary for lubricating. Furthermore, a relatively complicated oil change procedure is required, which is disadvantageous since the oil pan is generally located in an inaccessible position and special devices for catching the oil are required. Such a system is also disadvantageous since the lubrication begins only after a certain running time of the engine, that is, after a certain pressure has built up in the lubricating system. During the period of pressure build-up, the engine bearings run without lubrication and are subjected to increased wear.

In the case of the dry sump lubricating system, the oil is pumped from a tank to the lubricating points, collected in the dry sump and pumped back to the tank. In this lubricating system, the amount of oil needed is not as critical as in the circulating forced lubricating system, but this system also has a number of the disadvantages mentioned above, and in addition it requires the utilizations of two pumps.

In accordance with the present invention, a lubricating system for internal combustion engines is provided which consists of a reservoir tank, a dry sump, and a pump that draws lubricating fluid and air from the dry sump to the reservoir, and maintains the air and lubricating fluid in the reservoir under pressure from immediately prior to the first turn of the engine and during the operation thereof so that lubrication fluid is supplied from the reservoir to the engine immediately prior to the first turn of the engine and while the engine is running. In this manner the lubricating points of the engine are provided with oil before the engine begins to turn, thereby avoiding excessive wear on the engine. Lubrication in this manner is achieved by utilizing an electrical oil pump which is connected to the circuit of the primary coil of the engine starter. After closing the circuit of the primary coil the electric pump begins turning prior to ignition of the engine, so that pressure is built up in the reservoir and oil is supplied to the engine before the engine is started.

It has been found advantageous to provide the tank with a filter bed on the pump side for filtering impurities from the oil.

With a lubrication system in accordance with the present invention, the oil pressures produced by conventional electric pumps is sufficient. However, in order to avoid elevated pressures and, consequently, the opening of the safety valve in the pump, which would interrupt the flow of oil, it is advantageous to insert a safety valve in the pressure side of the lubricating system, preferably in the gas zone, which opens under pressure of about one half atmosphere gauge less than the maximum pressure produced by the pump.

The present invention is illustrated diagrammatically by way of example in the accompanying drawing.

The single FIGURE illustrates a schematic diagram of the lubricating system of the present invention.

Referring to the drawing in detail, it will be seen that the lubricating system of the present invention includes an oil reservoir or tank 1 which is adapted to contain substantially all of the lubricating fluid of this system and which is removably mounted on the engine. Reservoir 1 is connected to the lubricating points 5 of the engine by a conduit 3.

Oil flows from the engine lubricating points 5 to a sump 6 where it is collected and from which it is returned by an electric pump 8 through a conduit 10 to the reservoir 1. The pump 8 is electrically connected to the circuit of the primary coil 12 of the engine starter 14. After the primary circuit is closed and before the starter motor is engaged with the engine to turn the latter, pump 8 turns and draws lubricating fluid and air from sump 6 to the reservoir 1, thereby pressurizing the air and lubricating fluid in the reservoir. As a result lubricating fluid is forced, under the pressure in reservoir 1, through conduit 3 to lubricating points 5. This is achieved before the starter is engaged with the engine so that lubricating points 5 are lubricated before the first turn of the engine.

Reservoir 1 is provided with a filter bed 2 therein in order to screen impurities from the lubricating fluid drawn by pump 8 into the reservoir. A combined safety air relief valve 7 is mounted on the reservoir and empties through a pipeline 11 to the sump 6. The relief valve 7 is set to permit discharge of pressurized air therethrough at a level one half an atmosphere gauge less than the maximum pressure produced by the pump 8 so that in the event the pressure within reservoir 1 becomes excessive, the valve will open to decrease the pressure therein at a pressure which is lower than that at which the safety valve on the pump would open. In this manner possible interruption of the flow of the supply of oil from the pump is avoided.

Reservoir 1 is advantageously removably mounted on the engine in order to permit convenient oil changes. It is contemplated that the entire reservoir may be replaced in an oil change or alternatively, that the reservoir be removed, emptied, refilled with new oil, and replaced on the engine.

What is claimed is:

1. An internal combustion engine lubricating system containing air and lubricating fluid therein comprising a dry sump, reservoir means for containing pressurized air and substantially all of the lubricating fluid in said system, conduit means connecting said reservoir to said engine and electric pump means for drawing lubricating fluid and air from said dry sump to said reservoir and for maintaining the air and lubricating fluid in said reservoir under pressure from at least immediately prior to the first turn of the engine and during the operation thereof whereby lubricating fluid is supplied from the reservoir to said engine through said conduit means immediately prior to the first turn of the engine and while the engine is running.

2. A lubricating system as defined in claim 1 wherein said reservoir means is removably mounted on said engine.

3. A lubricating system as defined in claim 2 including an air relief valve mounted on said reservoir means.

4. A lubricating system as defined in claim 3 wherein said reservoir includes a filter bed.

5. A lubricating system as defined in claim 1 wherein said internal combustion engine includes an electric starter having a primary coil, said electric pump means being operatively connected to the primary coil of said starter whereby said pump means begins to operate prior to the first turn of said engine, thereby to supply lubricating fluid from said reservoir to said engine prior to the first turn thereof.

* * * * *